UNITED STATES PATENT OFFICE.

ALEXANDER CLASSEN, OF AACHEN, GERMANY.

IODIN DERIVATIVES OF PHENOLS AND BISMUTH SALTS THEREOF.

SPECIFICATION forming part of Letters Patent No. 618,168, dated January 24, 1899.

Application filed November 3, 1896. Serial No. 610,937. (Specimens.)

*To all whom it may concern:*

Be it known that I, ALEXANDER CLASSEN, a subject of the Emperor of Germany, and a resident of Aachen, in the Empire of Germany, have invented certain new and useful Improvements in Iodin Derivatives of Phenols and the Bismuth Salts Thereof, (for which I have obtained the following Letters Patent in foreign countries: Great Britain, No. 12,987, dated July 4, 1894; Luxemburg, No. 2,221, dated January 18, 1895; Italy, Reg. Gen., Vol. XXIX, No. 38,079, and Reg. Att., Vol. LXXIV, No. 374, dated March 31, 1895; Norway, No. 4,466, dated January 22, 1895, and No. 4,467, dated July 29, 1895; Portugal, No. 1,958, dated September 19, 1895; Brazil, No. 1,916, dated September 3, 1895; British India, No. 610, dated February 23, 1895; Sweden, Nos. 7,132 and 7,134, dated January 25, 1895; Denmark, No. 767, dated October 2, 1895, and Germany, Nos. 85,929 and 85,930, dated May 26, 1895, No. 86,069, dated July 22, 1895, and No. 88,390, dated May 14, 1896,) of which the following is a specification.

Iodin derivatives of phenols have already been produced in great number. I have discovered that new iodin compounds are obtainable which are also capable of pharmaceutical application if the phenolphtalein is treated in a suitable manner with iodin or substances yielding iodin. According to my investigations the phenolphtalein can be readily converted into iodin derivatives by solution in alkalies, addition of iodin, and precipitation of the products by means of acids. The iodin compounds thus obtained differ from the iodin derivatives hitherto produced from the oxy bodies by the fact that by the entrance of all the iodin bodies into the benzene nuclei the hydrogen atoms of the hydroxyl groups remain free and give the resulting compounds the character of strong acids. The iodin derivatives of aromatic oxy bodies hitherto produced in alkaline solution are without any exception insoluble in alkalies, and the reason of this insolubility consists in the presence of iodin-oxy compounds. The proof that in the case of the iodin derivatives of phenolphtalein all the iodin atoms are in the nuclei consists not only in their acid nature, but also in the titrimetrical determination of the number of the hydroxyl groups, from which it resulted that in the case of the iodin compounds obtained their number is always equal to that of the original matters. Another proof for this position is their behavior in the presence of acetic anhydrid. While it has been shown that the iodin compounds of phenolphtalein are converted by boiling for several hours on the reflux cooler with acetic anhydrid into corresponding (triaceto) compounds, which by boiling with soda-lye are reconverted into the original iodin compounds, the action of the acetic anhydrid on halogen-oxyl compounds takes place in quite a different manner. Either the iodin contained in the hydroxyl groups is separated with the formation of an acetyl derivative containing correspondingly less iodin atoms or the iodin atoms are transposed into the nucleus. Moreover, all the halogen-oxyl compounds are completely insoluble in alkalies and show only little resistance. On the contrary, the iodin compounds of the phenolphtalein substituted in the nucleus can be treated with boiling soda-lye without decomposing them. The acid nature enables them, moreover, to form salts with light and heavy metal.

The iodin can be employed either dissolved in a solution of potassium iodid or in any other suitable solvent, or it may be employed in the form of iodids with the addition of agents capable of liberating iodin—for instance, chlorid of lime, chlorin, bromin, or the like.

According to my researches the electric current can also be used more profitably in order to liberate iodin from the iodids. Iodin chlorid or the combination of iodin chlorid and muriatic acid or the like agents can be used in place of iodin for producing the iodin compounds from the said hydroxyl products or secondary amins or the like. The production of the iodin compounds hereinbefore defined is illustrated by the following examples. The parts are by weight.

1. *Process for Preparation of Tetra-iodo-phenolphtalein.*

(*a*) *Under cooling.*—Thirty grams phenolphtalein are dissolved in one hundred grams water containing forty grams sodium hydrate. To this is added a solution of one hundred grams iodin and one hundred and twenty grams potassium iodid in four hundred grams water, the temperature of which must not exceed 20° centigrade. The red color of the alkaline phenolphtalein solution is during this process changed into a deep blue. The solution is then well cooled, and cold hydrochloric acid is added. An amorphous yellowish-brown body is precipitated, which by thoroughly washing with a solution of potassium iodid and water can be perfectly purified. If the moist precipitate is raised to a higher temperature, (about 100° centigrade,) it is converted into a white body—namely, tetraiodophenolphtalein, while the yellowish-brown body produced in the cold is to be considered as tetraiodophenolphtalein plus one molecule of water. It is purified by solution of the undried precipitate in chloroform and precipitation with ligroin, and after drying *in vacuo* it is obtained as a yellow powder devoid of odor and is perfectly permanent in light and air. The analysis gives:

Calculated for $C_{20}H_{10}I_4H_{20}$.

$I=60.4$ per cent. Found $I=60.05$ per cent.

The conditions as to solubility and other properties agree with those of the white tetraiodophenolphtalein, which is at once obtained.

(b) *By heating.*—If after adding the iodin the deep-blue solution be heated for some time on a steam-bath, the color changes into a yellowish-brown tint. If hydrochloric acid be added, a grey-white body is precipitated, which by thoroughly washing or also by dissolving in soda-lye and precipitating with acids is obtained in a white condition as tetraiodophenolphtalein. It must therefore be assumed that with the body produced in the cold and having an additional molecule of water the lactone formation is destroyed. In the same way that the yellow body can be converted into the white the reverse operation can be effected. If the white tetraiodid of phenolphtalein is dissolved in the cold in soda-lye and hydrochloric acid is added, under cooling, the first-described yellow body is precipitated. After heating with soda-lye until the color changes the white compound is again obtained by means of hydrochloric acid. The tetraiodophenolphtalein is insoluble in water and ligroin. In the other organic solvents, under heating, it is easily soluble, but with greater difficulty in the cold. It is most readily taken up by warm chloroform. It is insoluble in acids and readily soluble in alkalies. It is distinguished by perfect absence of odor, and it is quite permanent when exposed to light and moisture. The analysis gives the formula: $C_{20}H_{10}I_4O_4$.

| | Per cent. | Per cent. | Per cent. |
|---|---|---|---|
| Calculated: | I=61.7 | C=29.21 | H=1.22 |
| Found: | I=61.92 | C=29.23 | H=1.53 |

*Electrolytical production.*—Thirty grams phenolphtalein are dissolved in one hundred grams water containing thirty-five grams sodium hydrate. To this is added one hundred and forty grams potassium iodid in two hundred grams water, and it is subjected to electrolysis for some hours with a current of about 1.5 amperes. The change of color shows the end of the reaction. It is then heated until the blue tint has changed into brownish yellow and the tetraiodophenolphtalein is precipitated with hydrochloric acid.

*Process for the production of salts of tetraiodophenolphtalein.*

The salts can be obtained both from the brown and from the white body. They are easily obtained in a pure condition by transposing the soda salt of the tetraiodophenolphtalein with the chlorids or other soluble salts of the heavy metals. In this manner the aluminium, iron, zinc, lead, manganese, bismuth, and mercuric salts have been produced and tested in a pure state in large quantities. The following examples will illustrate the process:

*Production of the aluminium, zinc, lead, iron, and manganese salt.*—For obtaining the soda salt as first material for the production of the other salts tetraiodophenolphtalein is dissolved in water containing the calculated quantity of sodium hydroxid (one-tenth of the employed tetraiodophenolphtalein) and the solution is evaporated to dryness. The salt thus obtained represents, dried at 100°, a blue powder very easily soluble in water with a blue color, with more difficulty in alcohol. It corresponds to the formula:

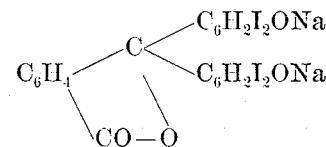

In adding to a solution of salts of the above-mentioned metals, such as aluminium, sulfate of zinc-sugar of lead, crystallized ferrous sulfate or iron alum, manganous sulfate, an aqueous solution of the soda salt of about five per cent. a momentaneous transposing takes place. The salts of the tetraiodophenolphtalein, which are completely insoluble in water, are precipitated. When the blue-solution color of the soda salts on the further addition to the solutions of the heavy metals becomes permanent, the transposing is finished. The separated salts are filtered, thoroughly washed, and dried. The salts represent a brown or red-brown powder, and as it results from analysis they possess a normal composition, so that the hydrogen atoms of the hydroxyl groups are substituted by a number of metallic atoms corresponding to the quantivalence of the metals. The zinc salt is constituted as follows:

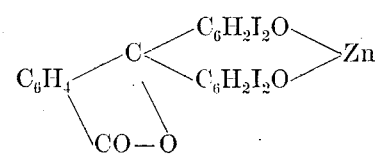

In an analogous manner there are formed lead and manganese salts and iron salt in using green vitriol. In employing iron alum there results the combination

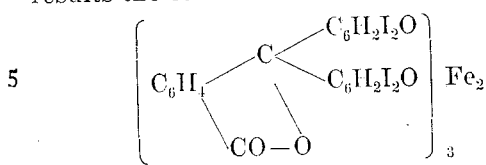

*Production of the mercuric and bismuth salt.*—The production of these two salts differs in so far from the production above explained, as owing to the difficulty of dissolving or decomposing the ordinary salts in water the compounds of the chlorids with the alkaline chlorids are used. One part of mercury or bismuth-chlorid is dissolved in ten parts of a saturated solution of common salt, and a one-per-cent. solution of the soda salt is allowed to flow into the solution until the supernatent liquid assumes the blue-solution color of the soda salt. The precipitate is then treated in the manner described under 1. Both the compounds form light-brown powders. Analyses give the normal composition—*i. e.*, for the mercury salt—

$$C_6H_4\diagdown C\diagup \begin{matrix} C_6H_2I_2O \\ C_6H_2I_2O \end{matrix} \diagdown Hg$$
$$\diagdown CO-O\diagup$$

for the bismuth salt—

$$\left\{ C_6H_4\diagdown C\diagup \begin{matrix} C_6H_2I_2O \\ C_6H_2I_2O \\ CO-O \end{matrix} \right\}_3 Bi_2$$

The production of all the salts is carried out without heating the solutions. All these salts are perfectly odorless and are unaffected by light and moisture.

In order to produce salts, I do not limit myself to the particulars above given, as these can be varied. (The salts of the iodo-oxytriphenylmethane, &c., can be effected by means of all the methods known and in use for analogous phenol salts.) The iodin products can be produced in addition to the methods explained in the above-cited methods, also by means of iodin chlorid or the combination of iodin chlorid and muriatic acid or by other substances acting in an analogous manner.

In addition to the method of iodating in alkaline solution there may be advantageously employed a new method of iodating not hitherto known. It consists in place of iodating in a solution of soda or potash lye or ammonia in bringing phenolphtalein dissolved in an aqueous solution of borates, biborates, phosphates, or pyrophosphates in connection with free iodin in solution in iodid of potassium or in any other solvent for iodin or with potassium iodid or iodic acids with the employment of a medium for liberating the iodin. The general characteristic of the salt solutions employed for this purpose is in addition to their solubility in water their property of forming with phenolphtalein a soluble alkali salt. The iodating in this operation does, however, not take place in alkaline solution, as the acids contained in the above-named salts being liberated by the action of the iodin produce a perceptible acid reaction, and consequently effect the immediate separation of the tetraiodophenolphtalein. Such salts are the normal phosphates and borates, as also the pyrophosphates and biborates. The best suited for this purpose are the soda salts.

The iodo-derivative separated by filtration is pure after once treating with steam, and the convenient means of purifying, in particular as compared with the tedious methods necessary with iodating in alkaline solution, is a great advantage when carrying out the process on a large scale. I will give some examples of the process.

1 *a*. Twenty grams phenolphtalein are dissolved under heating in three and one-half to four liters water containing four hundred grams borax in solution, (or any other biborate or borate,) and to this are added, also under heating, a solution of ninety grams iodin salts with a medium that will liberate the iodin—such as chlorin, bromin, chlorid of lime, &c. After alkaline reaction of the liquid the blue-solution color of the tetraiodophenolphtalein appears, which on further addition of iodin turns to yellow, the iodin beginning at the same time to separate. The reaction is completed, when the liquid permanently assumes the iodin color. The filtered product of the reaction is freed in a current of steam from any remaining iodin and is then pure. The identity of the product with tetraiodophenolphtalein is determined by its characteristic reactions and also by the analysis.

1 *b*. In employing the same proportions the process can also be carried out by allowing the aqueous borax solution or a phenolphtalein solution containing another biborate, borate, phosphate, or pyrophosphate to flow slowly into the iodin dissolved in the iodid-of-potassium solution and then purifying, by means of steam, the tetraiodophenolphtalein, which is at once separated and filtered.

11. Twenty grams phenolphtalein are dissolved together with four hundred grams sodium pyrophosphate (or any other pyrophosphate or phosphate soluble in water) in three and one-half to four liters water and this is added to a solution of ninety grams iodin and one hundred grams potassium iodid in one-half liter of water, under heating, either by adding the iodin-potassium-iodid solution according to 1 *a* or by pouring the phenolphtalein solution into the iodin-potassium-iodid solution according to 1 *b*. The separated tetraiodophenolphtalein is filtered and purified in a current of steam.

As an example of the applicability of iodin preparations for pharmaceutical purposes the properties of one of them—namely, of the tetraiodophenolphtalein and of some of its salts—will hereinafter be more fully described. The tetraiodophenolphtalein is in particular qualified in the treatment of wounds as an excellent substitute of iodoform, it possessing greater antiseptic power and at the same time does not irritate and is free from odor and poisonous properties; also, internally tetraiodophenolphtalein has successfully been employed in doses of 0.3 gram for intestinal catarrh. Owing to its insolubility in acids and its solubility in alkalies this substance passes through the stomach without being dissolved and acts only in solution in the alkaline contents of the intestines.

Soda salt is used as sprinkling powder in the case of purulent sores, in particular in the case of soft chancres. In aqueous solution it is employed for moist bandages and tampons at a concentration of two per cent. For rinsing the bladder in bladder-catarrh a solution of two per cent. has given very excellent results. For healing diseases of the throat and ear solutions from 0.1 to 0.5 per cent. are employed for gargling and rinsing. Bismuth salt is employed like the primitive substance internally and externally. (Mercury salt is used as sprinkling-powder in syphilitic diseases.) The examination of the other salts of the tetraiodophenolphtalein has given similar results.

What I claim as new, and desire to secure by Letters Patent, is—

1. The herein-described process for producing iodin compounds containing the iodin in the benzene nuclei, consisting in reacting with agents containing iodin on alkaline solution of phenolphtalein, subjecting the same to the action of the electric current to more completely liberate the iodin.

2. The herein-described process for producing iodin compounds containing the iodin in the benzene nuclei consisting in reacting with agents containing iodin on alkaline solution of phenolphtalein, subjecting the same to the electric current to more completely liberate the iodin, and precipitating by means of acids, such as hydrochloric acid, the free iodin compounds in case the resulting liquids show an alkaline reaction.

3. The herein-described process for producing iodin compounds containing the iodin in the benzene nuclei, consisting in reacting with agents containing iodin on an aqueous solution of phenolphtalein and salts soluble in water, such as sodium salt, subjecting the same to the action of the electric current to more completely liberate the iodin, precipitating by means of acids, such as hydrochloric acid, free iodin compounds in case the resulting liquids show an alkaline reaction.

4. The herein-described process for producing iodin compounds containing the iodin in the benzene nuclei consisting in reacting with alkaline iodin on phenolphtalein in the presence of iodin-liberating agents, such as potassium iodid, subjecting the same to the action of the electric current to more completely liberate the iodin, and precipitating by means of acids, such as hydrochloric acid, the free iodin compound in case the resulting liquid shows an alkaline reaction.

5. The herein-described process for producing iodin compounds containing the iodin in the benzene nuclei; consisting in reacting with agents containing iodin on alkaline solution of phenolphtalein, subjecting the same to the action of the electric current to more completely liberate the iodin, then reacting on a solution of the tetraiodophenolphtalein with sodium hydroxid and evaporating to dryness, and finally adding a solution of a metallic salt.

6. As a new article of manufacture a bismuth salt of an iodin compound containing the iodin in the benzene nuclei of phenolphtalein, the same being a reddish-brown powder, nearly odorless and tasteless, insoluble in water and acids, soluble with difficulty in alcohol and ether, and being adapted for use as an antiseptic in wounds, and for internal administration as an intestinal antiseptic.

Signed at Aachen, in the Empire of Germany, this 13th day of October, 1896.

ALEXANDER CLASSEN.

Witnesses:
JOHN HECKMANNS,
D. PANNET.